USO11222307B2

(12) United States Patent
Shen

(10) Patent No.: US 11,222,307 B2
(45) Date of Patent: Jan. 11, 2022

(54) INVENTORY TRACKING SYSTEM

(71) Applicant: Xerox Corporation, Norwalk, CT (US)

(72) Inventor: Ethan Shen, Toronto (CA)

(73) Assignee: Xerox Corporation, Norwalk, CT (US)

( * ) Notice: Subject to any disclaimer, the term of this patent is extended or adjusted under 35 U.S.C. 154(b) by 31 days.

(21) Appl. No.: 16/362,981

(22) Filed: Mar. 25, 2019

(65) Prior Publication Data

US 2020/0311655 A1 Oct. 1, 2020

(51) Int. Cl.
*G06Q 10/08* (2012.01)
*G08B 13/24* (2006.01)

(52) U.S. Cl.
CPC ....... *G06Q 10/087* (2013.01); *G08B 13/2417* (2013.01)

(58) Field of Classification Search
CPC ........ G06Q 10/00; G06Q 10/08; G06Q 30/02; G06Q 30/06; G06Q 20/20; G06Q 20/32; G06Q 10/06; G06F 3/045; G06F 7/00; G06F 17/00; G06F 3/041; G06F 16/00; H04N 5/232; G06K 7/10; G06K 7/14; G06K 1/12; G06B 13/248
USPC .............. 345/174; 340/603, 665, 5.92, 10.1; 348/158; 705/7.27, 26.7, 14.58, 26.1
See application file for complete search history.

(56) References Cited

U.S. PATENT DOCUMENTS

| | | | |
|---|---|---|---|
| 9,381,645 B1* | 7/2016 | Yarlagadda | ............ B25J 9/1633 |
| 10,037,509 B1 | 7/2018 | Huebner | |
| 10,262,293 B1* | 4/2019 | Prater | .................. G06Q 10/087 |
| 10,318,569 B1* | 6/2019 | Funk | ..................... G06Q 10/087 |
| 10,318,917 B1* | 6/2019 | Goldstein | ............ G06Q 20/208 |
| 10,332,066 B1* | 6/2019 | Palaniappan | .......... G01G 19/42 |
| 10,664,879 B2* | 5/2020 | Bordewieck | ........... G06Q 30/06 |
| 2008/0077511 A1* | 3/2008 | Zimmerman | ........ G05D 1/0246 |
| | | | 705/28 |
| 2010/0156597 A1* | 6/2010 | Stern | ..................... G06Q 10/087 |
| | | | 340/5.92 |
| 2010/0219958 A1* | 9/2010 | Caldwell | ............... A47F 5/0043 |
| | | | 340/603 |
| 2011/0050396 A1* | 3/2011 | Chaves | ................ G06Q 10/087 |
| | | | 340/10.1 |
| 2011/0288938 A1 | 11/2011 | Cook | |
| 2012/0161967 A1 | 6/2012 | Stern | |
| 2012/0299863 A1* | 11/2012 | Yilmaz | ............ G06K 19/07758 |
| | | | 345/174 |

(Continued)

OTHER PUBLICATIONS

RCS Global IT solutions: Active Shelf System, RFID Tracking for Retail Inventories (www.rcsapps.net/info/active-shelf.html), 1 page (2014), downloaded Jan. 10, 2019.

(Continued)

*Primary Examiner* — Olusegun Goyea
(74) *Attorney, Agent, or Firm* — Fay Sharpe, LLP

(57) ABSTRACT

A system for evaluating human interactions with items, such as products displayed on shelves, includes at least one wireless reader which collects data from a set of associated wireless tags in an interrogation zone. The tags and readers may be based on RFID technology. The collected data includes an identifier for an item that is associated with each wireless tag and a touch sensor status indicating whether the item is being touched. A computer receives and aggregates the collected data and outputs an evaluation of human interactions with the items based on the data.

15 Claims, 4 Drawing Sheets

(56) References Cited

U.S. PATENT DOCUMENTS

| | | | | |
|---|---|---|---|---|
| 2013/0238612 | A1* | 9/2013 | Tsongas | G06F 16/9535 |
| | | | | 707/723 |
| 2014/0074639 | A1* | 3/2014 | Tian | G06F 16/90335 |
| | | | | 705/26.1 |
| 2015/0149236 | A1* | 5/2015 | Sakamoto | G06Q 30/0201 |
| | | | | 705/7.27 |
| 2015/0339754 | A1* | 11/2015 | Bloem | G06F 16/9535 |
| | | | | 705/26.7 |
| 2015/0363758 | A1* | 12/2015 | Wu | G06K 9/2054 |
| | | | | 705/20 |
| 2016/0180404 | A1* | 6/2016 | Stern | H04L 67/18 |
| | | | | 705/14.58 |
| 2016/0371630 | A1* | 12/2016 | Jetcheva | G06Q 50/01 |
| 2016/0371631 | A1* | 12/2016 | Jetcheva | G06Q 10/087 |
| 2018/0276692 | A1* | 9/2018 | Sequeira | G08B 13/2462 |
| 2018/0315116 | A1* | 11/2018 | Medina | G06Q 30/0631 |
| 2019/0073616 | A1* | 3/2019 | Lewis | G06Q 10/06398 |
| 2019/0149725 | A1* | 5/2019 | Adato | H04N 1/32144 |
| | | | | 348/158 |
| 2019/0236531 | A1* | 8/2019 | Adato | G06K 9/00771 |
| 2019/0356539 | A1* | 11/2019 | Soon-Shiong | H04Q 9/02 |
| 2020/0245783 | A1* | 8/2020 | Smithson | A47F 5/116 |
| 2020/0245785 | A1* | 8/2020 | Smithson | H05K 1/118 |

OTHER PUBLICATIONS

G Xiao, et al., "Printed UHF RFID Reader Antennas for Potential Retail Applications," IEEE Journal of Radio Frequency Identification, vol. 2, Issue 1, pp. 31-37, 2018.

Sample, et al., "A capacitive touch interface for passive RFID tags," 2009 IEEE Int'l Conf. on RFID, pp. 103-109 (2009).

* cited by examiner

INVENTORY TRACKING SYSTEM

BACKGROUND

The exemplary embodiment relates to inventory tracking and finds particular application in connection with a system and method for evaluating human interactions with inventory in a store.

Stores generally have predetermined locations for each type of item on display in the store. Shoppers often interact with items by picking them up to check on features of the item, such as ingredients, components, and the like and may place the item back on the store shelf if they decide not to make a purchase, sometimes in an incorrect location. Store employees may sometimes incorrectly position items or move them to an incorrect location. To maintain inventory, assess shopper interest in products, and to be able to reassure their suppliers that agreements on store shelf placements are being properly maintained, store owners have an interest in monitoring the movement of items in the store.

Radio-frequency identification (RFID) technology has been used to detect items on shelves and other display units in stores. Each item may be provided with an RFID tag which communicates information to a reader device via radio-frequency waves or signals. The reader device may be fixed in position or mobile. Several reader devices may be located in a store or warehouse and transmit the information to a monitoring device. Such systems have been used for inventory control and security.

Such technology, however, is unable to record shopper-product interactions, such as that a product was picked up, looked at, and then put back onto the shelf or that a product was picked up and put back somewhere else in the store.

INCORPORATION BY REFERENCE

The following references, the disclosures of which are incorporated herein in their entireties by reference, are mentioned:

U.S. Pub. No. 20080077511, published Mar. 27, 2008, entitled SYSTEM AND METHOD FOR PERFORMING INVENTORY USING A MOBILE INVENTORY ROBOT, by Zimmerman, describes a mobile inventory robot system for generating an inventory map of a store and a product database by decoding product barcodes from captured images of shelves and detection of matching objects in the images.

U.S. Pub. No. 20100156597, published Jun. 24, 2010, entitled REAL-TIME AUTOMATIC RFID INVENTORY CONTROL SYSTEM, by Stern, et al., describes a system for tracking store items with RFID tags attached using wireless RFID readers and a monitoring server.

U.S. Pub. No. 20100219958, published Sep. 2, 2010, entitled INTELLIGENT SHELVING SYSTEM, by Caldwell, et al., describes a shelving system which integrates touch sensors, displays, lighting, and other components into shelves. An RFID tag may be associated with an item on the shelf.

U.S. Pub. No. 20120161967, published Jun. 28, 2012, entitled RFID-BASED INVENTORY MONITORING SYSTEMS AND METHODS WITH SELF-ADJUSTING OPERATIONAL PARAMETERS, by Stern, describes maintaining information reflecting a current inventory of articles based on radio frequency identification (RFID) tag identifying information received from one or more RFID tag readers.

U.S. Pub. No. 20120299863, published Nov. 29, 2012, entitled TOUCH SENSOR WITH RFID, by Yilmaz, describes combining an RFID tag with a touch sensor.

U.S. Pub. No. 20150363758, published Dec. 17, 2015, entitled STORE SHELF IMAGING SYSTEM, by Wu, et al., describes a store profile generation system with a mobile base and an image capture assembly mounted on the base for acquiring images of product display units in a product facility. Product-related data extracted from the acquired images is used to construct a store profile indicating locations of product labels throughout the product facility.

U.S. Pub. No. 20180315116, published Nov. 1, 2018, entitled SYSTEM FOR AUTONOMOUS CONFIGURATION OF PRODUCT DISPLAYS, by Medina, describes using sensors, such as an image capture device, a pressure sensor, a touch sensor, an infrared sensor, a microphone, an RFID sensor, or a motion sensor, in a method for autonomous reconfiguration of product displays.

BRIEF DESCRIPTION

In accordance with one aspect of the exemplary embodiment, a system for evaluating human interactions with items includes at least one wireless reader which collects data from a set of associated wireless tags in an interrogation zone, the collected data including an identifier for an item associated with each wireless tag and a touch sensor status indicating whether the item is being touched. A computer aggregates the collected data and outputs an evaluation of human interactions with the items based on the data.

In accordance with another aspect of the exemplary embodiment, a method for evaluating human interactions with items includes, with at least one wireless reader, collecting data from a set of associated wireless tags in an interrogation zone, the collected data including an identifier for an item associated with each wireless tag and a touch sensor status indicating whether the item is being touched. The collected data is aggregated and an evaluation of human interactions with the items is generated, based on the aggregated data.

In accordance with another aspect of the exemplary embodiment, a system for evaluating human interactions with items includes memory which stores instructions for aggregating data acquired from RFID readers, the data including, for each of a plurality of RFID tags associated with a respective item, an identifier for the item and a touch sensor status indicating whether the item is being touched, generating an evaluation of human interactions with the items based on the data, and displaying the evaluation on a display device. A computer processor implements the instructions.

DETAILED DESCRIPTION

Aspects of the exemplary embodiment relate to a system and method for collecting and analyzing product movement and, from the analysis, deriving shopper behavior information, specifically, the interaction between shoppers and products in a retail store.

Radio-frequency identification (RFID) refers to the use of radio-frequency (RF) waves or signals to transmit data. RFID systems typically include RFID transponders or "tags" and RFID readers. An RFID reader, also referred to as an interrogator, may transmit an RF signal to an RFID tag. The RFID tag may receive the signal and, in response, transmit identification information stored in a memory of the RFID tag. RFID tag identification information may include a number identifying the RFID tag and/or it may include information identifying a product to which the RFID tag is attached. While in the exemplary embodiment, particular reference is made to RFID readers and tags, other wireless technologies exist which may alternatively be used, such as those employing Wi-Fi or Bluetooth protocols.

Figure 1:
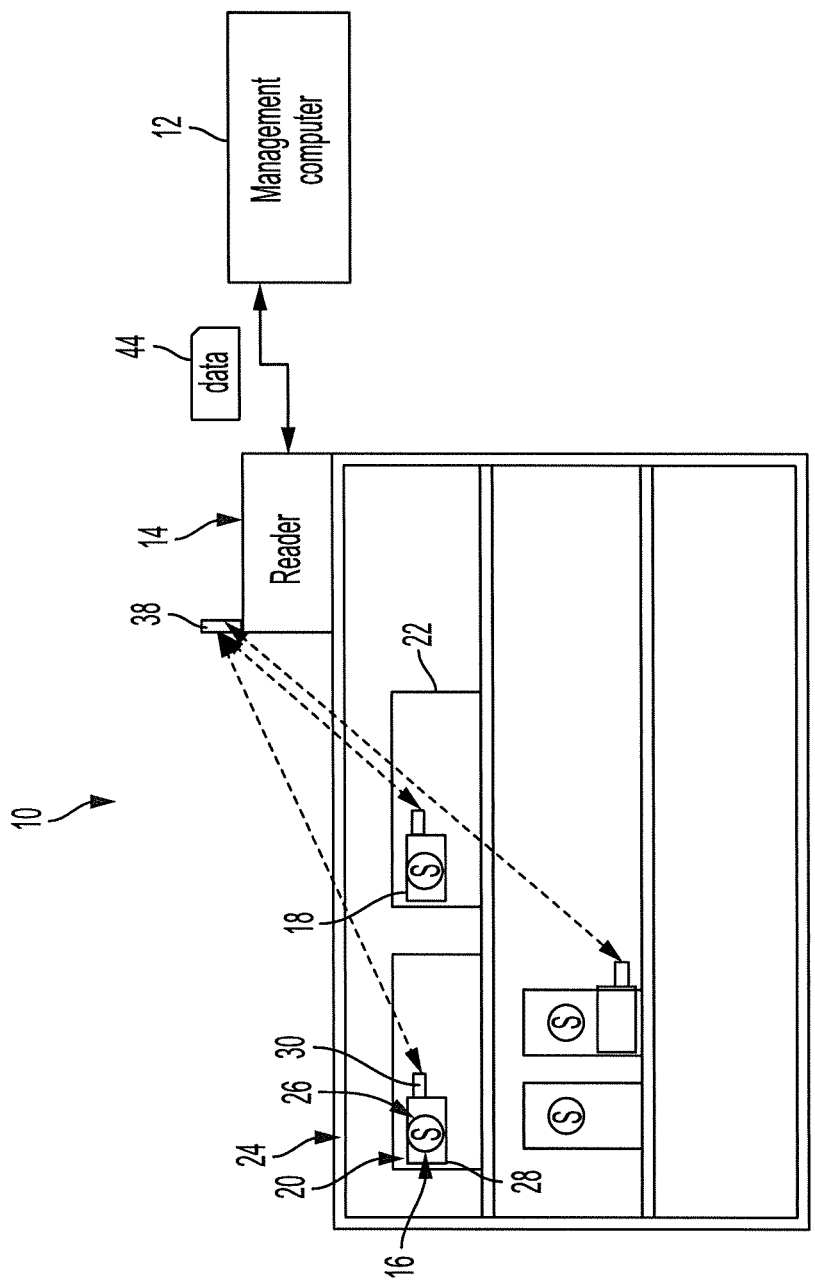
FIG. 1 illustrates an environment in which a system for evaluating human interactions with product items operates.

With reference to FIG. 1, an environment in which a product interaction system 10 operates is illustrated. In one embodiment, the system 10 can be employed in a retail store having a large inventory. In another embodiment, the system 10 can be employed in a store for controlled substances, such as drugs.

The system 10 includes a management computer 12, which communicates with a set of wireless (e.g., RFID) readers 14 (only one of which is shown), that are each located within receiving range of information generators 16, 18, etc. Each information generator 16, 18 is closely associated with, e.g., mounted on, a respective item 20, 22, that is located on a display device 24, such as a store shelf or set of shelves. Each information generator 16, 18 includes a touch sensor 26 and a wireless (e.g., RFID) tag 28, which may be separate or combined.

The touch sensor 26 detects a human interaction with the product 20. For example, the touch sensor may include conductive traces printed on or otherwise attached to the product. The touch sensor may operate by detecting a change in capacitance when a finger alters the mutual coupling between the conductive traces, for example through touch or through close proximity. Each product may have a single touch sensor 26 or more than one touch sensor. As will be appreciated, larger products may be fitted with multiple touch sensors.

The RFID tags 28 generally include an integrated circuit that stores and processes information and that modulates and demodulates radio-frequency (RF) signals, a mechanism for collecting DC power from the incident reader signal (or an integral source of power), and an antenna 30 for receiving and transmitting the signal. The tag information is stored in a non-volatile memory. The RFID tag 28 includes either fixed or programmable logic for processing the transmission and sensor data, respectively. The touch sensor may be integral with the RFID tag or be in wired communication therewith. One example RFID tag with a touch sensor is described in Sample, et al., "A capacitive touch interface for passive RFID tags," 2009 IEEE International Conference on RFID, pp. 103-109 (2009). In some embodiments, the traces used for the touch sensor 26 can function as the antenna 30 of the RFID tag or are formed during the same process.

The RFID reader 14 transmits an encoded radio signal to interrogate the tag(s) 28 within signal range (the interrogation zone). The RFID tag receives the message and then responds with its identification and other information. This may be only a unique tag serial number or may be product-related information such as a stock number, lot or batch number, production date, price, size, quality, or other specific information. For example, one type of soda may have a different identifier from another type. Since tags have individual serial numbers, the RFID system can discriminate among several tags that maybe within the range of the RFID reader and read them simultaneously. In general, metal shelves do not interfere with the RFID signals, particularly when ultra high frequency (UHF) RFID is used. This allows one reader to have an interrogation region which encompasses multiple shelves.

The exemplary RFID system may be an Active Reader Passive Tag (ARPT) system having an active reader, which transmits interrogator signals and also receives authentication replies from passive tags or an Active Reader Active Tag (ARAT) system which uses active tags awoken with an interrogator signal from the active reader. A variation of this system could also use a Battery-Assisted Passive (BAP) tag which acts like a passive tag but has a small battery to power the tag's return reporting signal or to log tag activities.

Due to the short range of the reader, a specific interrogation zone is created for a small subset of RFID tags local to the reader. Tags may go in and out of the interrogation zone when an associated product 20, 22 is moved.

The association of the touch sensor 26 and RFID tag 28 with a product on a store shelf enables an event to be recorded each time a product 20, 22 is being touched. In one embodiment, when the RFID tag 28 is interrogated by the RFID reader 14, it activates the touch sensor 26 to determine the state of the associated object 20.

Figure 2:
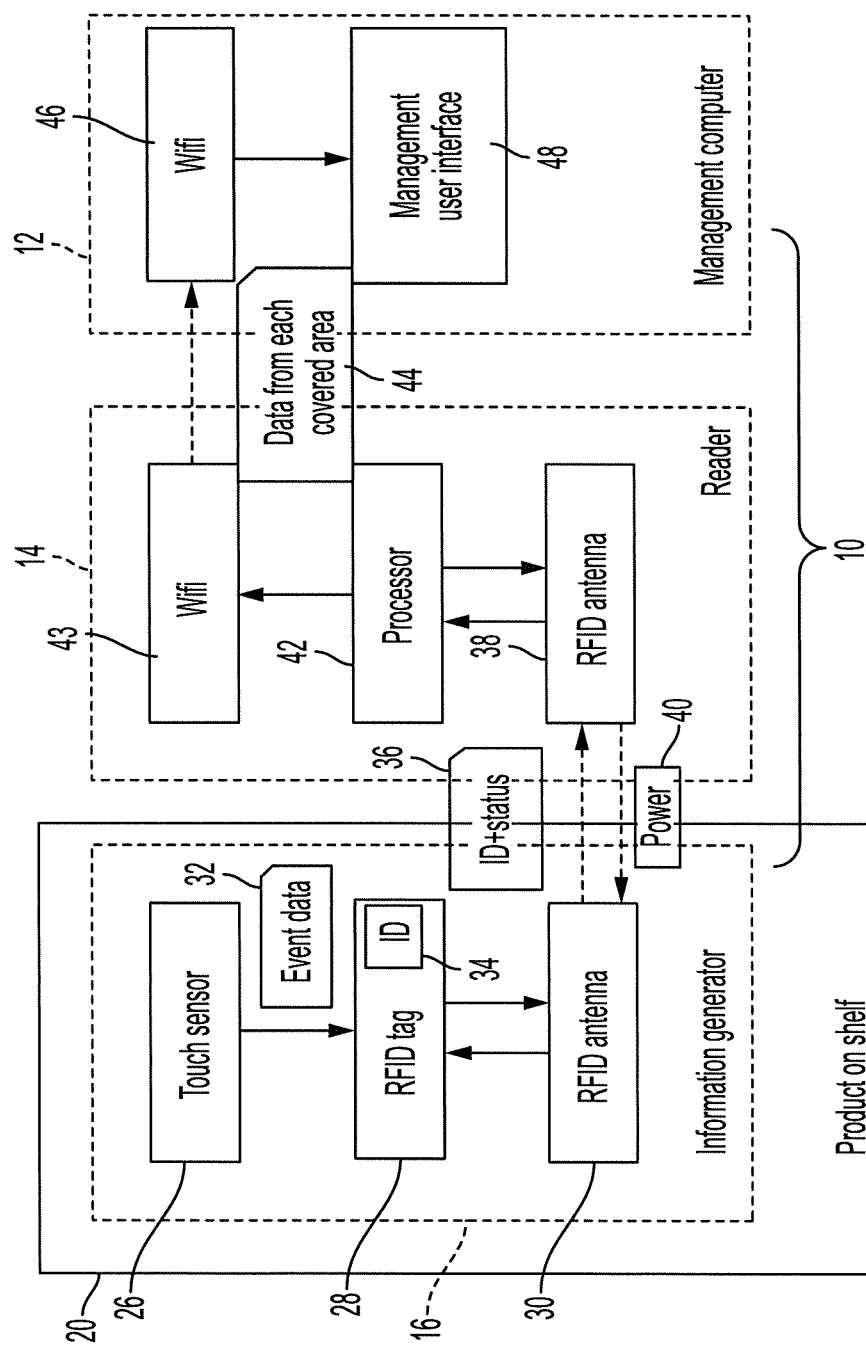
FIG. 2 is a functional block diagram of the evaluation system.

With reference also to FIG. 2, the touch sensor 26 detects touching of the respective product 20 and outputs event data 32, indicating that the product has been touched, which is received by the RFID tag 28. For example, the touch sensor 24 sets a status indicator on the RFID tag when it is being held by a person.

The RFID tag stores, e.g., in persistent memory, a unique identifier (ID) 34. The reader 14 periodically polls all RFID tags within RF range and receives information 36, via its own antenna 38, which includes the ID 34 and a status that is based on the event data 32, specifically, whether or not the product is currently being touched (as identified by the touch sensor status indicator). RFID tags are able to transmit multiple bits of information, thus allowing one or more bits to be used to identify the product (e.g., its SKU number) and one or more bits to convey the touch sensor status (i.e., is the product being touched or not).

In the exemplary embodiment, the RFID tag 28 receives electric power 40, for powering the RFID tag, from the reader 14, via the antennae 38, 30. This allows low-cost RFID tags with printed antennas to be used. In other embodiments, the RFID tag may be self-powered.

The reader 14 includes a processor 42, which may perform initial processing of the received information 36 before storing it to temporary memory. The processor 42 may also cause the RFID antenna 38 to periodically provide the RFID tag 28 with power 40, causing the tag to output current information 36 such as the ID 34 and a status, such as whether or not a touch event has been recorded since the last interrogation. Each piece of information 32 is associated with a time stamp, allowing information such as: when the product was touched, for how long the product was touched before being replaced, whether the touching was followed by removal of the product from the shelf (the reader no longer detects the product's tag). The reader may interrogate the RFID tags at fixed time intervals, such as of a few seconds, or less. The reader 14 may be powered by its own power source, such as a battery, or be connected to an external electric power source, such as the electric grid.

The reader 14 includes an output device 43, such as a WIFI signal transmitter, which outputs data 44 collected from the reader's covered interrogation zone. The output data 44 includes, or is based on, the information 36 generated by the information generators 16, 18, etc. The data 44 is received by a corresponding input device 46, such as a WIFI receiver, of the management computer 12. In other embodiments, the data 44 may be transmitted by another suitable link, such as a cable, telephone line, or the like. A management user interface 48 is configured for outputting an analysis of the data 44.

Figure 3:
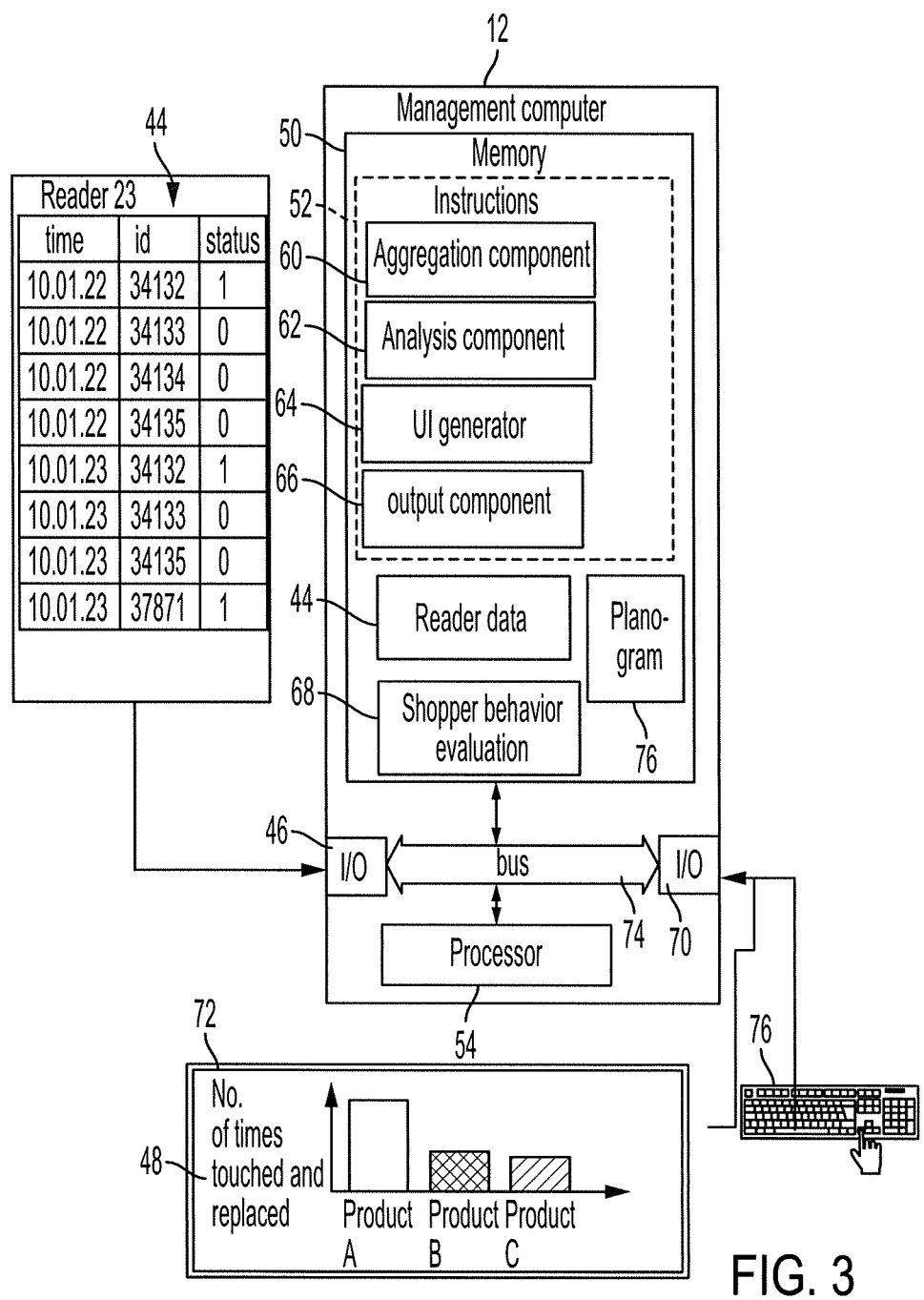
FIG. 3 is a functional block diagram of a management computer of the evaluation system.

With reference also to FIG. 3, the management computer 12 analyzes the data 44 to provide information on shopper behavior. The computer 12 includes memory 50 which stores instructions 52 for processing the data 44 and a processor 54, in communication with the memory, for executing the instructions. The instructions 52 cause the reader data 44 received from the readers 14 to be stored in memory 50 during processing and may include an aggregation component 60, an analysis component 62, a user interface (UI) generator 64, and an output component 66.

The aggregation component 60 may aggregate the reader data 44 from two or more readers 14 and/or over one or more time periods and store the aggregated data in a suitable data structure, such as a database table. The table is updated as new information is received and may be purged, at intervals of outdated data. The location of each product is inferred from its RFID tag location, which can be roughly estimated from the location of the reader that receives an echo signal from the RFID tag. If more than one reader reads a tag, then the system determines the location of the tag to be within the intersection of the interrogation regions of the readers.

In one embodiment, the location of each of the readers can be stored in memory 50 during their installation. In an alternative embodiment, the readers can be "self-locating," by providing location information along with the collected data 44.

The analysis component 62 may process the aggregated data to generate an evaluation 68 of shopper behavior for one or more of the products displayed in the store or in a group of stores. The UI generator 64 converts the evaluation 68 to a human readable form. The output component 66 outputs the evaluation in human readable form via the user interface 48.

An input/output device 70 provides the user interface 48 to an associated display device 72, such as a computer monitor, screen, or the like. Hardware components 46, 50, 54, 70 of the management computer may communicate via a data/control bus 74. A user input device 76, such as a keyboard or touch or writable screen, and/or a cursor control device, such as mouse, trackball, or the like, may be provided for inputting text and for communicating user input information and command selections to the processor device 54.

The analysis component 62 may generate an evaluation 68 of shopper behavior, which may include one or more of:

1. The number of times a product has been picked up and put back in the same location (indicating that the shopper is interested but has not purchased the product). The results may be aggregated by product type for a given time period.

2. How much time a shopper spent holding a product (the length of time that the touch status indicator is set to on) before returning the product to the same location. The results may be aggregated by product type for a given time period.

3. Whether a product was taken and purchased or put back in the same location. The movement of the product from one reader's interrogation zone to the interrogation zone of another reader may be used as an indicator that the product has been placed in a shopping cart for purchase. Alternatively, or additionally, information acquired from a cash register may be used to verify that the product has been purchased. The results may be aggregated by product type for a given time period.

4. Whether a product was taken and placed in another location (e.g., in a different interrogation zone). For example, a user may pick up one product and then decide that another product is preferred and may place the discarded product at the location of the selected product. The touch sensor allows the times of the two touches to be compared and the inference of the user's behavior to be inferred.

The analysis may include studying the effect of product position, product price, alternative products nearby, and/or other product-related features on the likelihood that a product is picked up and replaced versus purchased.

From the analysis, retailers may assess suitable pricing for products and/or perform other analytics. Deeper descriptive analytics accesses information around shopper behaviors and merchandising compliance leading to predictive models of sales and ultimately prescriptive insight for strategies to optimize merchandising and store layout. For example, if shoppers are spending significant time looking at new products then replacing them on the shelves, rather than buying them, the store could provide additional product information on the shelves, change the packaging, or give shoppers an incentive to buy, such as a discount. If shoppers are interacting with products differently at different times of the day, this information is useful to stores in planning restocking of shelves.

The analysis component 62 may also use the reader data 44 to check for misplaced products, for example, to ensure planogram compliance. A planogram 76 may specify, for each reader, a location in the store as well as the products which may be within the reader's interrogation zone. Products 20, 22 may be moved to/from a reader's interrogation zone by shoppers or store personnel. By analyzing the data from one or more readers, movement of a product onto a shelf or from one shelf to another can be determined and incorrectly positioned products identified. Movement of products during store opening hours may be attributed to shoppers rather than store personnel, allowing the cause of non-compliance with the planogram 76 to be attributed to shoppers. On the other hand, products that are incorrectly positioned on a shelf 24 outside of store opening hours may be attributed to store personnel.

Primary users of the system may include consumer goods manufacturing companies, retail stores, and companies providing services to retail stores.

The system may also find application in places that need to monitor usage of controlled substances, such as in laboratories and hospitals. Usage of chemicals or drugs can be monitored and controlled to provide an extra layer of safety and security. Each permitted user may have a user identifier which is recorded when the user enters and leaves a secure product storage facility. The touching of a given product in the same time period can be linked to the user.

The computer 12 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 50 may represent any type of non-transitory computer readable medium such as random access memory (RAM), read only memory (ROM), magnetic disk or tape, optical disk, flash memory, or holographic memory. In one embodiment, the memory 50 comprises a combination of random access memory and read only memory. Memory 50 stores instructions for performing the exemplary method as well as the processed data 68.

The digital processor device 54 can be variously embodied, such as by a single-core processor, a dual-core processor (or more generally by a multiple-core processor), a digital processor and cooperating math coprocessor, a digital controller, or the like. The digital processor 54, in addition to executing instructions 52 may also control the operation of the computer 12.

The term "software" or "instructions," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
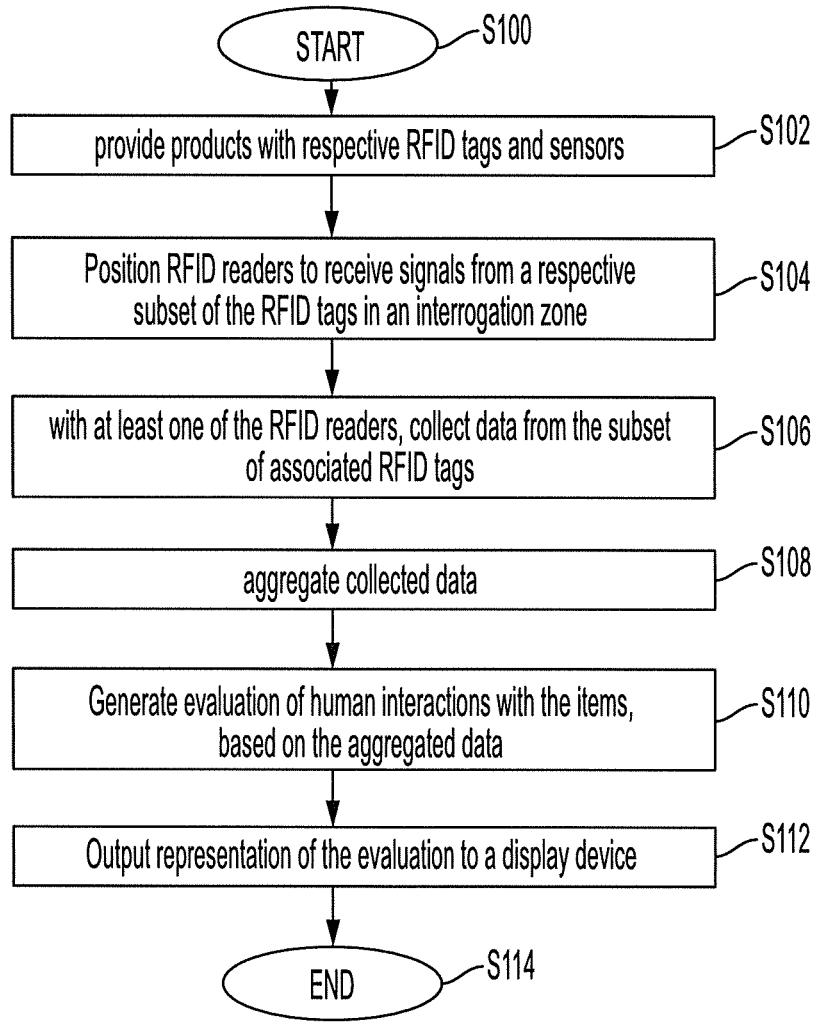
FIG. 4 is a flow chart illustrating a method for evaluating human interactions with items.

With reference to FIG. 4, a method for evaluating human interactions with items which may be performed with the system of FIGS. 1-3 is illustrated. The method begins at S100.

At S102, products are provided with respective RFID tags and touch sensors.

At S104, RFID readers are each positioned to receive signals from a respective subset of the RFID tags in an interrogation zone.

At S106, with at least one of the RFID readers, data is collected from the subset of associated RFID tags, the collected data including an identifier for an item associated with each RFID tag and a touch sensor status indicating whether the item is being touched.

At S108, the collected data from the at least one RFID reader is aggregated. The aggregation may include aggregating data for each of a set of products or product types in a given time period or aggregating data for a single product or product type over multiple time periods.

At S110, an evaluation of human interactions with the items is generated, based on the aggregated data.

At S112, a representation of the evaluation is output to a display device, allowing a user to make inferences or decisions based on the evaluations.

The method ends at S114.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 12 (for example, an internal hard drive of RAM), or may be separate (for example, an external hard drive operatively connected with the computer 12), or may be separate and accessed via a digital data network such as a local area network (LAN) or the Internet (for example, as a redundant array of inexpensive or independent disks (RAID) or other network server storage that is indirectly accessed by the computer 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 4, can be used to implement the method for evaluating user behavior with respect to items. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

To evaluate the system and method, a touch sensor and RFID circuitry for UHF RFID was printed onto two objects. The touch sensor was a printed conductive trace connected to the external sensor input pin of a RFID sensory chip (AMS SL900A). Each chip is preprogrammed with a unique identifier. When the RFID is being interrogated, it activates the touch sensor to determine the state of the object. A RFID reader interrogates and collects data from surrounding tags and relays the data to a PC through USB cable. The tags do not require any external power whereas the reader needs to be powered. Although simplified, the evaluation showed that the system is able to track and record the status of multiple tags.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for evaluating shopper interactions with items comprising:
    a set of wireless tags, each of the wireless tags being associated with a respective item, each wireless tag including, or being in wired communication with, a touch sensor, the touch sensor including conductive traces, the touch sensor detecting a change in capacitance between the conductive traces when a finger alters a mutual coupling between the conductive traces, a touch sensor status being set for the wireless tag in response;

at least one wireless reader which collects data from the set of associated wireless tags in an interrogation zone, the collected data including an identifier for the item associated with each wireless tag and a touch sensor status indicating whether the item is being touched; and a computer which aggregates the collected data and outputs an evaluation of human interactions with the items, based on the collected data, wherein the evaluation of human interactions includes an inference as to shopper preferences for items or an inference as to shopper interference with a planogram compliance, based on whether an identifier for one of the items and touch sensor status for the item indicate that the item was taken and placed in a different location.

2. The system of claim 1, wherein the wireless tag incorporates the touch sensor which generates the touch sensor status.

3. The system of claim 1, wherein the computer aggregates the collected data over a plurality of time periods and outputs an evaluation of human interactions with the items for each time period.

4. The system of claim 1, wherein the items are products on store shelves.

5. The system of claim 1, wherein the items are controlled substances and the system associates a user identifier with items that are touched.

6. The system of claim 1, wherein the evaluation of human interactions is output to a user interface.

7. The system of claim 1, wherein the at least one wireless reader comprises a plurality of wireless readers.

8. The system of claim 1, wherein the wireless tags are RFID tags and the wireless reader is an RFID reader.

9. A method for evaluating human interactions with items comprising:

with a set of wireless tags, attached to respective items in an interrogation zone, setting a touch sensor status indicating whether the respective item is being touched, each of the wireless tags including a touch sensor which detects human interactions with the respective item;

with at least one wireless reader, collecting data from the set of wireless tags in the interrogation zone at fixed time intervals, the collected data including an identifier for the item associated with each wireless tag and the touch sensor status indicating whether or not the item is being touched;

aggregating the collected data for each of a set of items or product types in a given time period; and generating an evaluation of human interactions with the items, based on the aggregated data, wherein the evaluation includes drawing an inference as to shopper interference with a planogram compliance.

10. The method of claim 9, wherein the evaluation of human interactions includes determining:

a number of times that an item has been picked up and put back in a same location;

an amount of time that an item was held before being put back in a same location;

whether an item was taken and purchased or put back; and whether an item was taken and placed in a different location.

11. The method of claim 9, wherein the aggregation of the collected data includes aggregating collected data for each of a plurality of time periods and outputting an evaluation of human interactions with the items for each time period.

12. A computer program product comprising memory which stores instructions, which when implemented by a processor, perform the method of claim 9.

13. A system for evaluating human interactions with items comprising:

a set of RFID readers, each of the RFID readers being in communication with a respective plurality of RFID tags, each of the RFID tags being attached to a respective item, each RFID tag including, or being in wired communication with, a touch sensor, the touch sensor causing a touch sensor status to be set for the RFID tag, the touch sensor status indicating whether the item is being touched;

memory which stores instructions for:
aggregating data acquired from the RFID readers for each of a plurality of times, the data including, for each of the plurality of RFID tags associated with a respective item, an identifier for the item, and a touch sensor status indicating whether the item is being touched, generating an evaluation of human interactions with the items based on the data, the evaluation including determining:

a number of times that an item has been picked up and put back in a same location;

an amount of time that an item was held before being put back in a same location;

whether an item was taken and purchased or put back;

whether an item was taken and placed in a different location; and displaying a representation of the evaluation on a display device; and a processor which implements the instructions.

14. The method of claim 1, wherein the inference as to shopper preferences for items or the inference as to shopper interference with a planogram compliance is based on a comparison of a time the item placed in the different location of was touched and of a time another item in the different location was touched.

15. The method of claim 1, wherein movement of an item from an interrogation zone of one reader to an interrogation zone of another reader is used as an indicator that the item has been placed in a shopping cart for purchase.

* * * * *